Patented Sept. 2, 1941

2,254,748

UNITED STATES PATENT OFFICE 2,254,748

PRODUCTION OF HYDROCARBONS FROM CARBON MONOXIDE AND HYDROGEN

Wilhelm Michael, Ludwigshafen-on-the-Rhine, and Wolfgang Jaeckh, Heidelberg, Germany, assignors, by mesne assignments, to William E. Currie, New York, N. Y.

No Drawing. Application April 9, 1938, Serial No. 201,128. In Germany April 14, 1937

3 Claims. (Cl. 260—449)

The present invention relates to the production of valuable hydrocarbons containing more than one carbon atom in the molecule from carbon monoxide and hydrogen.

A process for the manufacture and production of liquid, solid and gaseous hydrocarbons or their derivatives containing oxygen has already been proposed according to which catalysts are used which have been prepared by thermal treatment of iron compounds or substances containing the same, advantageously in the presence of reducing gases, at such high temperatures ranging above 600° C. but below the melting or sublimation point of the metal compound or metal resulting from this treatment and for such a long duration that at least a partial sintering of the iron compound or the iron takes place.

In the said process the thermal treatment may also be carried out in two or more stages, the iron compounds first being heated to above 600° C. in the presence of non-reducing gases, as for example nitrogen or air, and then treated with reducing gases.

It has further been proposed to prepare metal compounds which are to be treated thermally by precipitating metals of the iron group in the form of compounds reducible to metal by heating with hydrogen, adding compounds which are converted by heating into oxides which cannot be reduced to metal with hydrogen or can only be so reduced with difficulty, and finally heating at such a high temperature and for such a long time that at least a partial sintering takes place.

We have now found that catalysts of high activity and good stability are obtained by first reducing metal compounds, in particular those of the metals of the iron group and especially those of iron, in the presence of reducing gases at an elevated temperature below 500° C., no sintering thus taking place, and then treating them in the presence of non-oxidizing (inert or even reducing) gases or in vacuo at a temperature above 500° C., advantageously above 600° C., in such a manner, i. e. for such a long time that at the particular temperature employed at least a partial sintering of the reduced substance takes place. At the moderately elevated temperature below 500° C., a reduction of the metal compound to metal takes place, while at the higher temperature then employed a sintering of the reduced substance takes place. Both the treatment with reducing gases and the subsequent treatment in the presence of non-oxidizing gases or in vacuo may be effected in one or more stages.

The reduction of the metal compounds is advantageously carried out between about 300 and 450° C. or higher, while for the subsequent thermal treatment of the reduced substances in the presence of non-oxidizing gases or in vacuo temperatures of for example 600°, 700°, 800°, 1000° C. or higher may be used with advantage.

As reducing gases there may be mentioned in particular hydrogen or gases containing hydrogen, as for example hydrogen in admixture with methane, or gases yielding hydrogen; carbon monoxide or hydrocarbons, such as methane and ethane, may, however, also be used.

As non-oxidizing gases for the thermal treatment above 500° C. there may be mentioned nitrogen, argon, hydrogen and the like or mixtures of the same.

The gases used in the thermal treatment above 500° C. should not effect an appreciable oxidation of the reduced substances. If small amounts of oxidizing constituents are present therein, they may be rendered non-injurious by the addition of small amounts of reducing gases.

The said reduction of the catalysts, and also the thermal treatment at above 500° C., may be carried out at atmospheric, reduced or increased pressure, as for example at 2, 5, 20, 100 atmospheres or more, and the pressure may be identical or different in the two stages.

The conversion of the carbon monoxide with the hydrogen in the presence of the catalysts thus obtained is effected at temperatures above 150° C., preferably between 200° and 450° C. Atmospheric pressure or subatmospheric pressure may be employed, but it is preferable to employ elevated pressures, such as 5, 10, 20, 50, 100 atmospheres or more.

The products obtained by the said conversion are hydrocarbons containing more than one carbon atom in the molecule, in particular liquid and solid, but also gaseous hydrocarbons and/or liquid or solid oxygen-containing derivatives of hydrocarbons, such as alcohols, ketones, esters, acids, aldehydes and the like.

The following example will further illustrate the nature of this invention but the invention is not restricted to this example.

Example

Precipitated iron hydroxide is stirred with 3 per cent of aluminum hydroxide (calculated on metallic iron), dried and reduced at 450° C. with hydrogen until there is no further formation of water. The reduced mass is heated for about 3 hours at 850° C. with nitrogen substantially free from oxygen, cooled in a stream of nitrogen and then charged in the form of pieces into a reaction vessel through which a mixture of carbon monoxide and hydrogen in the ratio 1:2 is led at about 320° C. under a pressure of 15 atmospheres. In addition to gaseous hydrocarbons, there are thus formed abundant amounts of liquid hydrocarbons and smaller amounts of solid hydrocarbons. The liquid hydrocarbons contain a few per cent of compounds containing oxygen.

What we claim is:

1. A process for the conversion of carbon monoxide and hydrogen into hydrocarbons containing more than one carbon atom in the molecule which comprises contacting the said carbon monoxide and hydrogen at a reacting temperature between 150° and 450° C. with a catalyst prepared by reducing a compound of a metal of the iron group, reducible to the metal at a temperature below 500° C., by treatment at an elevated temperature below 500° C. with a reducing gas and then treating the reduced substance in the absence of an oxidizing gas at such a high temperature above 500° C. but below the melting point of the reduced substance and for such a long time that at least partial sintering of the reduced substance takes place.

2. In the process as claimed in claim 1 contacting the carbon monoxide and hydrogen with a catalyst prepared by reducing a reducible compound of a metal of the iron group at a temperature below 500° C. and then heating the reduced substance to a temperature above 600° C., but below the melting point of the reduced substance.

3. In the process as claimed in claim 1 contacting the carbon monoxide and hydrogen with a catalyst prepared by reducing a reducible iron compound at a temperature below 500° C. and then heating the reduced substance to a temperature above 600° C., but below the melting point of the reduced substance.

WILHELM MICHAEL.
WOLFGANG JAECKH.